(12) United States Patent
O'Brien

(10) Patent No.: US 6,462,876 B1
(45) Date of Patent: Oct. 8, 2002

(54) MULTI-WAVELENGTH ETALON

(75) Inventor: Stephen O'Brien, Lower Macungie Township, Lehigh County, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/441,019

(22) Filed: Nov. 16, 1999

(51) Int. Cl.⁷ .............................................. G02B 27/00
(52) U.S. Cl. ...................... 359/577; 359/580; 359/586; 359/589; 356/454
(58) Field of Search ................................ 359/577, 580, 359/584, 586, 587, 589; 356/454

(56) References Cited

U.S. PATENT DOCUMENTS

| | | | |
|---|---|---|---|
| 4,377,324 A | 3/1983 | Durand et al. ............... | 350/166 |
| 4,756,606 A | 7/1988 | Jewell et al. ................ | 350/354 |
| 4,822,998 A | 4/1989 | Yokota et al. ............... | 250/226 |
| 5,039,201 A | 8/1991 | Liu ............................. | 359/589 |
| 5,128,798 A | 7/1992 | Bowen et al. ............... | 359/260 |
| 5,144,498 A | 9/1992 | Vincent ....................... | 359/885 |
| 5,889,590 A | * 3/1999 | Duggal et al. ............... | 356/352 |
| 6,005,995 A | * 12/1999 | Chen et al. .................... | 385/24 |

OTHER PUBLICATIONS

L.N. Hadley and D.M. Dennison, "Reflection and Transission Interference Filters", *Journal of the Optical Society of America*, vol. 37, Nos. 1–12, 1947, pp. 451–465.

A.F. Turner and O.A. Ullrich, "Continuously Variable Interference Filters," *Journal of the Optical Society of America*, vol. 38, Nos. 1–12, 1948, p. 662.

* cited by examiner

*Primary Examiner*—Cassandra Spyrou
*Assistant Examiner*—Alessandro V. Amari

(57) ABSTRACT

A multi-wavelength etalon comprises at least two regions with different indices of refraction. The change in refractive index alters the wavelengths of incident light, and thus the number of wavelengths between the reflective surfaces of the etalon, and therefore the etalon's transmission characteristics. By selecting specific indices of refraction, an etalon can be provided which produces peaks and troughs at preselected wavelengths in each region. The transition between two adjacent regions with different indices of refraction can be graded to reduce optical interference which may result from an abrupt transition.

7 Claims, 7 Drawing Sheets

MULTI-WAVELENGTH ETALON

TECHNICAL FIELD

This invention is related to an improved multi-wavelength etalon. More specifically, this invention is related to an etalon having a varied index of refraction.

BACKGROUND OF THE INVENTION

In many applications, it is necessary to accurately determine the wavelength(s) of light incident on a suitable detector. A widely used type of detector includes an etalon to filter specific frequencies of light. An etalon is a type of interference filter in which the intensity of transmitted light is dependent on its wavelength.

FIG. 1 is a illustration of a conventional etalon 10. The etalon has two partially reflective parallel surfaces 12, 14 which are separated by a distance d and is comprised of a material 16 with an index of refraction r. When collimated light having a wavelength $\lambda$ is passed through the etalon, some of the light is reflected between the surfaces 12, 14. The multiply reflected light beams interfere with each other, either constructively or destructively, and thus alter the overall intensity of the light which passes through the etalon 10, e.g., as measured by photodetector 18.

Maximum transmission occurs when twice the distance between the reflective surfaces 12, 14 is an integral number of wavelengths $\lambda$ in the etalon. In other words, $2d*r/\lambda=x$, where x is an integer. The transmission characteristic of etalon 10 is a periodic function of wavelength and the percentage of reflectivity R of the partially reflective surfaces 12, 14. The thickness d and refractive index r of the etalon determine the distance between the transmission peaks around a given wavelength. The reflectivity R of the surfaces determines the percentage of the light that is reflected by the etalon walls. This defines the amount of light which is available for constructive and destructive interference, and thus how narrow or broad the transmission peaks are.

Often, it is desirable to provide a light sensor which is sensitive to, and can discriminate among, several different frequencies of incident light at the same time, which frequencies may be closely spaced. Such a sensor is useful in applications including spectrographic analysis and precise tuning of lasers for use in, e.g., multi-laser fiber optic communication systems. Although several discrete etalons can be utilized for these purposes, in some implementations, a stepped etalon 20 is used instead. In this arrangement, illustrated in FIG. 2, one or both active (i.e., reflective) surfaces of the etalon are stepped so that each step on the etalon provides a region of different thickness. By adjusting the thicknesses appropriately, each step can be configured to pass different frequencies of light. Stepped spectrographic etalon arrangements of this type are shown in U.S. Pat. No. 4,822,998 to Yokota et al. and U.S. Pat. No. 5,144,498 to Vincent.

In use, the stepped etalon 20, having partially reflective coatings 11a, 11b, is positioned over an appropriately configured array of photodetectors 18a, 18b, where each detector is aligned with the land 13a, 13b of a corresponding etalon step. When a beam of light is directed onto the etalon 20, the intensity of the output signal attributed to each detector 18a, 18b indicates the intensity of light passing through the etalon in the region of the corresponding step. Thus, the detector outputs provide a measure of the intensity of incident light with the particular frequencies passed by the various thicknesses of the etalon at each step.

A disadvantage inherent in the use of stepped etalons is that it can be difficult to form the steps such that each step land is optically flat because the existence of steps makes polishing the separate land surfaces difficult. Another drawback to a stepped etalon configuration is the interference caused by the abrupt transition between the lands of adjacent steps. In a conventional unstepped etalon, the intensity within a collimated light beam transmitted through an etalon has the same intensity pattern as the incident beam, typically gaussian-like. However, when an abrupt step is present, the incident and resonant light, in addition to being reflected, is diffracted. This produces interference within the transmitted beam along an axis approximately perpendicular to the step edge. The result of the diffraction is that in the vicinity of the step, there is substantial angular dispersion of the light which reduces the quality of the transmission function. This is evidenced by reduced signal amplitude and broadened peaks.

The effect of the interference and overall reduction in etalon quality associated with abrupt steps also creates a "dead spot" behind and near the step edge in which accurate intensity readings are compromised. Thus, there are portions of the etalon where a detector cannot be placed due to the reduced quality of the transmitted beam. For example, experiments using an etalon with a thickness of approximately 2 mm and a step height of approximately 0.2 um indicate that there is a dead spot approximately 600 to 800 um wide directly behind the step. Since input beam widths of between 0.5 to 5.0 mm are common, a significant portion of the transmitted beam will not have high quality etalon transmission characteristics and thus will not be suitable for detection. Having a dead spot in the beam reduces the available optical power for measurement and lowers the power-per-detector. Since a minimum signal-to-noise ratio is required for reliable measurements, decreasing the power-per-detector thus can decrease the accuracy of the detector and the stability of equipment which is adjusted according to the etalon measurements.

Accordingly, it would be advantageous to provide an etalon which is sensitive to multiple discrete wavelengths and which can easily be polished to optical flatness on both sides. It would be further advantageous if such an etalon had only limited interference between regions sensitive to the various discrete wavelengths.

SUMMARY OF THE INVENTION

According to the invention, an etalon is formed having at least two regions with different indices of refraction. The change in refractive index alters the wavelengths of incident light in the etalon. This results in changes in the number of wavelengths between the reflective surfaces of the etalon, and therefore, changes in the etalon's transmission characteristics. Such an etalon can be configured such that the transmission characteristics for the different regions provide for peaks and troughs at preselected wavelengths. Because multi-wavelength selectivity can be achieved without the use of steps, the reflecting surfaces of the etalon can be easily polished a high optical quality flatness using conventional techniques. Further, such an etalon can be thinner than a multi-wavelength etalon which utilizes steps. Preferably, the transition between two adjacent regions with different indices of refraction is graded to reduce optical interference which may result from an abrupt transition.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENT(s)

Figure 1:
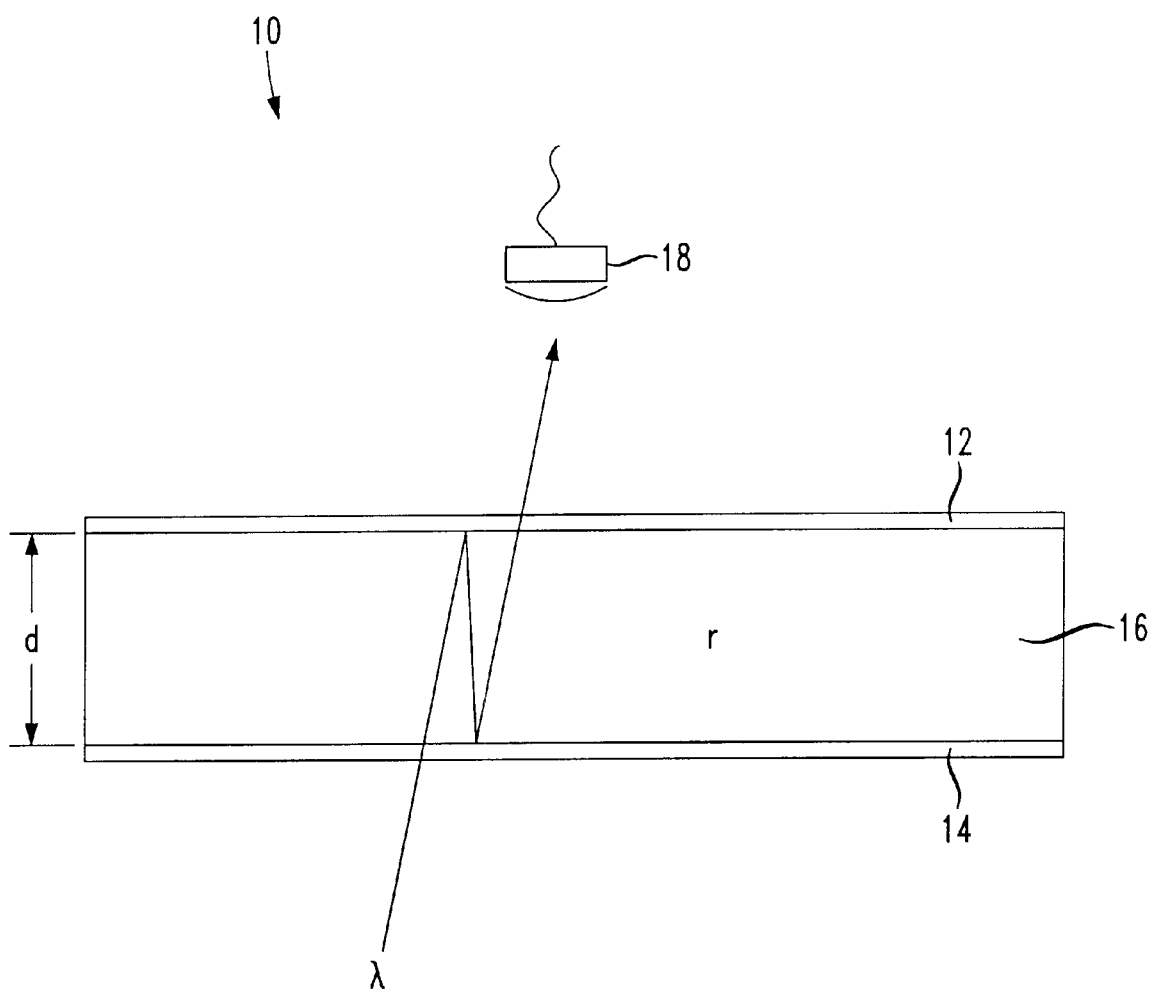
FIG. 1 is a diagram of a conventional etalon.
Figure 2:
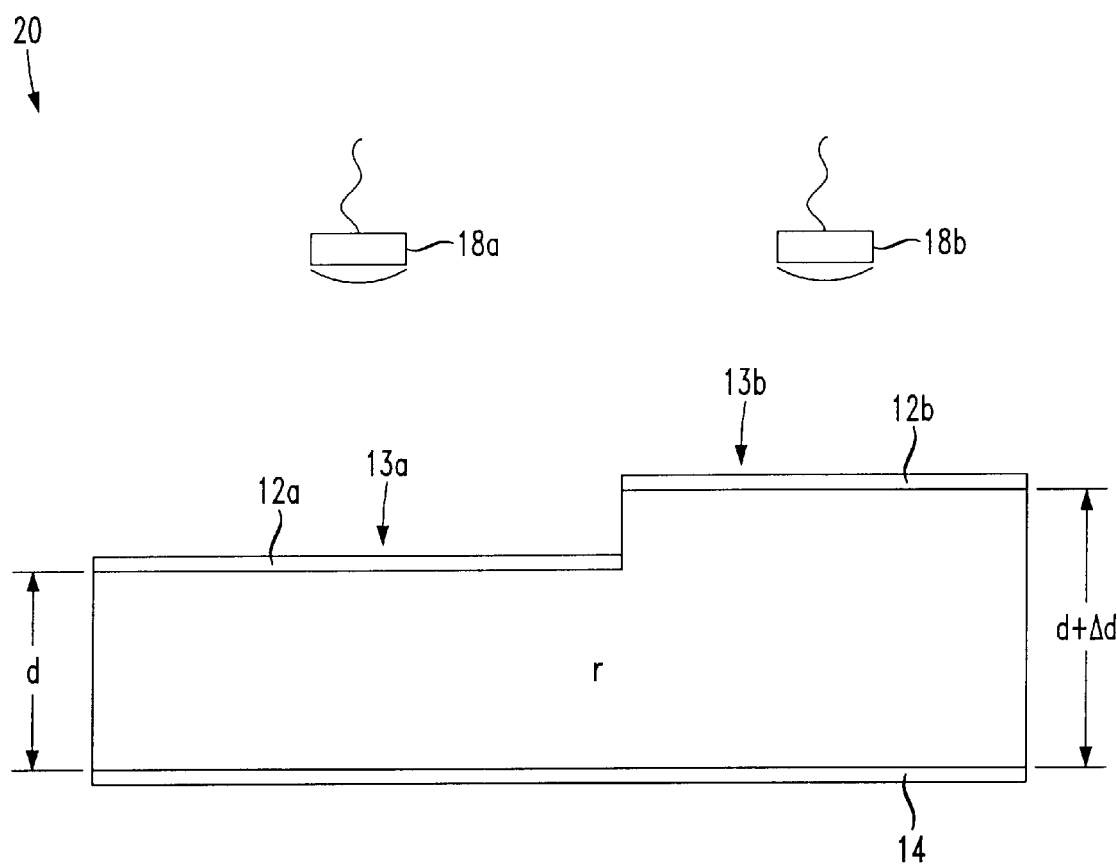
FIG. 2 is a diagram of a conventional stepped etalon.
Figure 3:
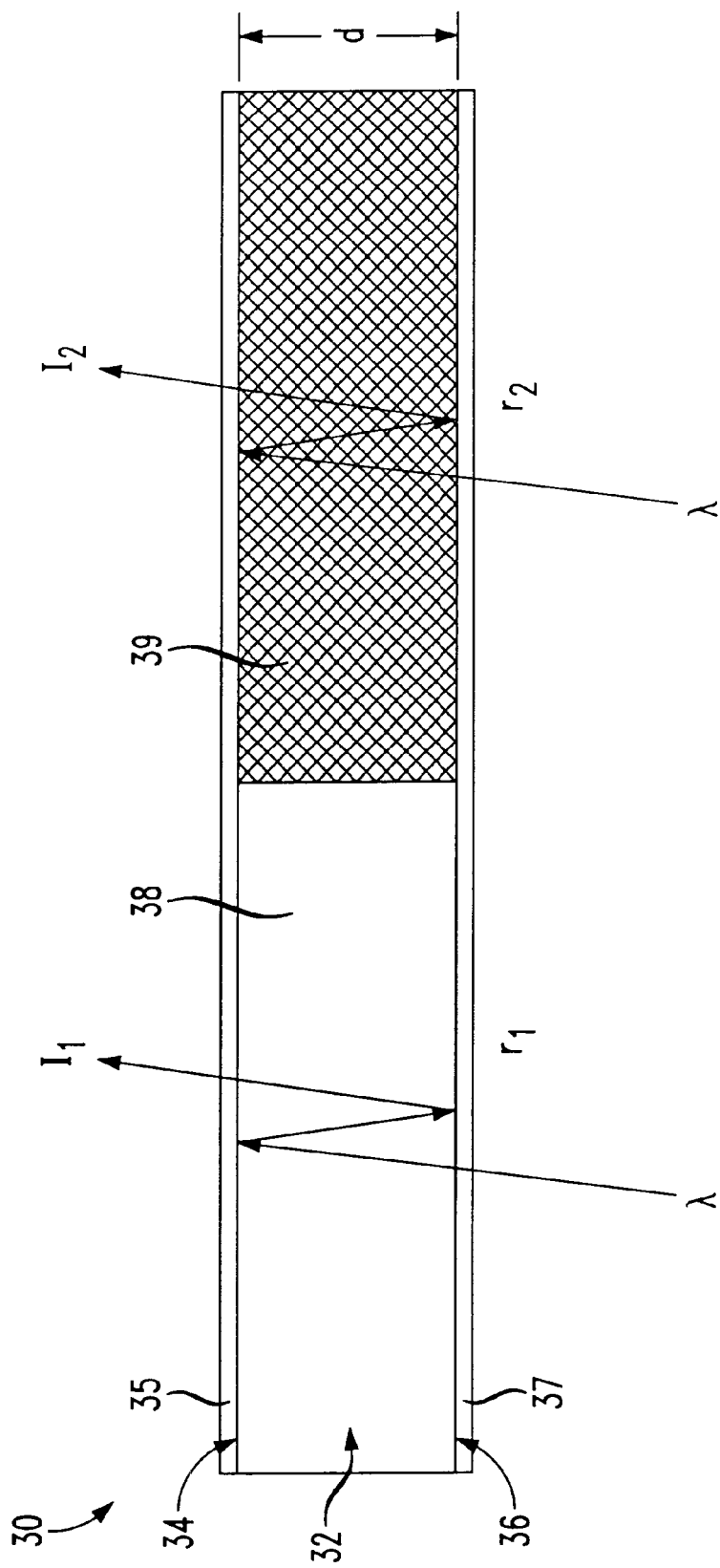
FIG. 3 is a diagram of a multi-wavelength etalon according to a first embodiment of the invention

With reference to FIG. 3, a multi-wavelength etalon 30 according to the invention is comprised of a body 32 which is transparent to least in a predetermined range of wavelengths and has first and second opposing sides 34, 36. Each side 34, 36 is substantially optically flat and is coated with a partially reflective surface 35, 37. Preferably sides 34, 36 are substantially parallel to each other. However, an angled orientation may be desirable in particular applications.

The body 32 of etalon 30 has at least two regions 38, 39 with differing indices of refraction $r_1$, $r_2$, respectively. Maximum transmission through the etalon occurs when twice the distance between the reflective surfaces 12, 14 is an integral number of wavelengths $\lambda$ within the etalon. An incident light beam having a wavelength of $\lambda$ has a wavelength within the etalon of $\lambda_E = \lambda/r$. For an etalon 30 with constant thickness d throughout, the transmission characteristics of light with a wavelength of $\lambda$ incident the first region 38 will peak when $2d*r_1/\lambda$ is an integer and incident light of the same wavelength passing through the second region 39 will have a transmission peak when $2d*r_2/\lambda$ is an integer. By selecting the indices of refraction, peaks in the transmission characteristics of the two regions can be offset from one another a desired amount.

Figure 4:
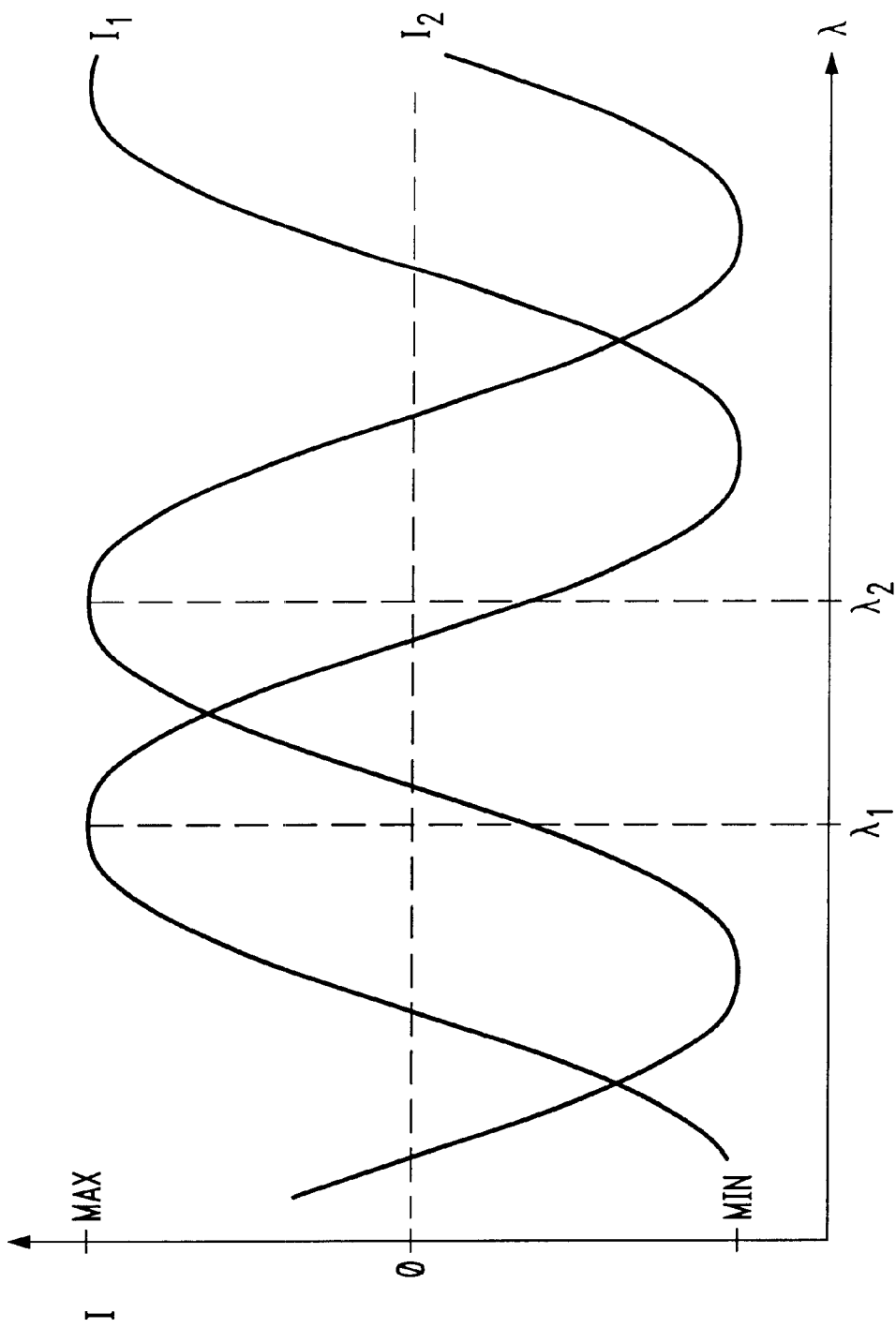
FIG. 4 is a graph of the transmission characteristics of the etalon of FIG. 3.

FIG. 4 is a graph of the transmission characteristics of the etalon of FIG. 3 showing such an offset. As illustrated, the intensity $I_1$ of light transmitted through the first region 38 has a peak at a first wavelength $\lambda_1$. The intensity $I_2$ of light transmitted through the second region 39 has a peak at a second wavelength $\lambda_2$. The particular separation between the two peaks $\lambda_1$ and $\lambda_2$ can be adjusted by carefully selecting the materials used to make the etalon body 32.

The reflectivity R of the surfaces 34, 36 determine the percentage of the light that is reflected by the etalon sides. This defines the amount of light which is available for constructive and destructive interference, and thus, how narrow or broad the transmission peaks are. The reflectivity R of the sides of the stepped etalon is between approximately 5%–95%. The specific reflectivity values used depend upon the desired operating characteristics for the particular application at issue. For an etalon used in tuning laser frequencies, the reflectivity is preferably approximately 40% to provide the best balance between the steepness of the curves and the contrast between the transmission peaks and troughs.

Advantageously, multi-wavelength capacity is achieved by etalon 30 without the use of steps as in conventional multi-wavelength etalons. Because the top and bottom sides 34, 36 can be flat across the both surfaces can easily be polished to optical flatness using conventional polishing techniques which are unsuitable for use in a stepped etalon configuration.

Depending on how etalon 30 is fabricated, the index of refraction transition between the first and second regions 38, 39 may be relatively abrupt. This can result in interference which reduces the quality of light transmitted through the etalon in the vicinity of the transition region. This interference is similar to that caused in the region of an abrupt step.

Figure 5:
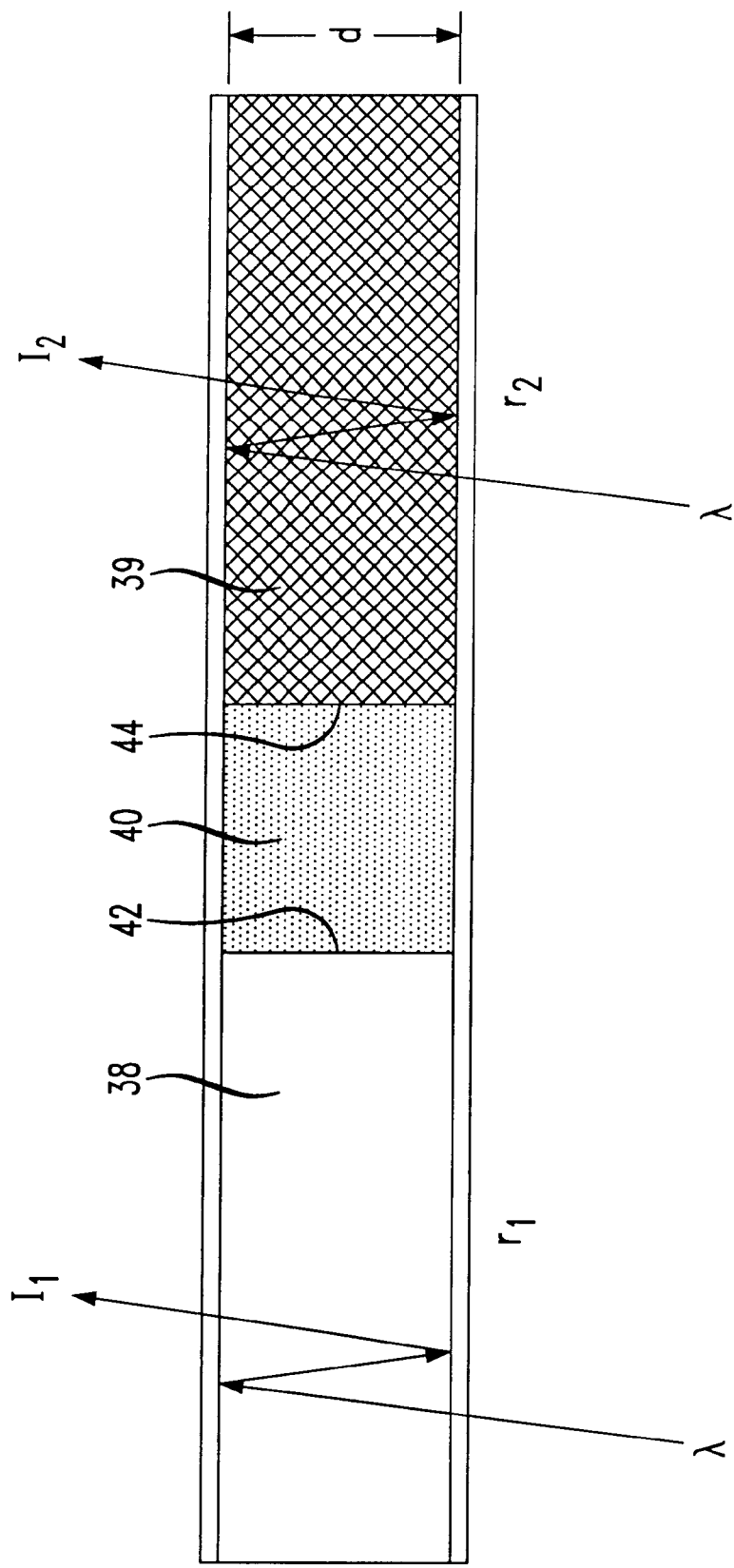
FIG. 5 is a diagram of a multi-wavelength etalon according to a second embodiment of the invention.

In a preferred embodiment, illustrated in FIG. 5, the transition between the two regions 38, 39 is softened. In particular, a third region 40 situated between the first and second regions is provided and which has a graded index of refraction that varies from $r_1$, at the boundary 42 with the first region 38 to $r_2$ at the boundary 44 with the second region 39. The transition may be stepwise. Preferably, however, the transition is smooth and non-abrupt.

An etalon 30 according to the invention can be fabricated in a number of different ways. For example, the first and second regions 38, 39 can be separately formed and then fused or otherwise placed adjacent each other. Although different materials can be used for each region, preferably, both regions are formed from the same base material, such as silicon dioxide (SiO2) and the index of refraction of one or both regions is altered by introducing various dopants in controlled amounts, which dopants and amounts are dependent on the desired index of refraction and the base material. The selection of appropriate dopants and amounts can be made according to conventional techniques known to those of skill in the art.

A smooth index of refraction transition can be formed between the two regions 38, 39 by heating the body 32 to encourage the dopants to migrate across the boundary. To produce a more gradual transition, the third region 40 may be initially doped to have an index of refraction between that of the first and second regions 38, 39 and then the diffusion process initiated. Various methods of introducing the dopants may be used along with other methods to produce a varied index of refraction, as will be known to those of skill in the art.

Figure 6:
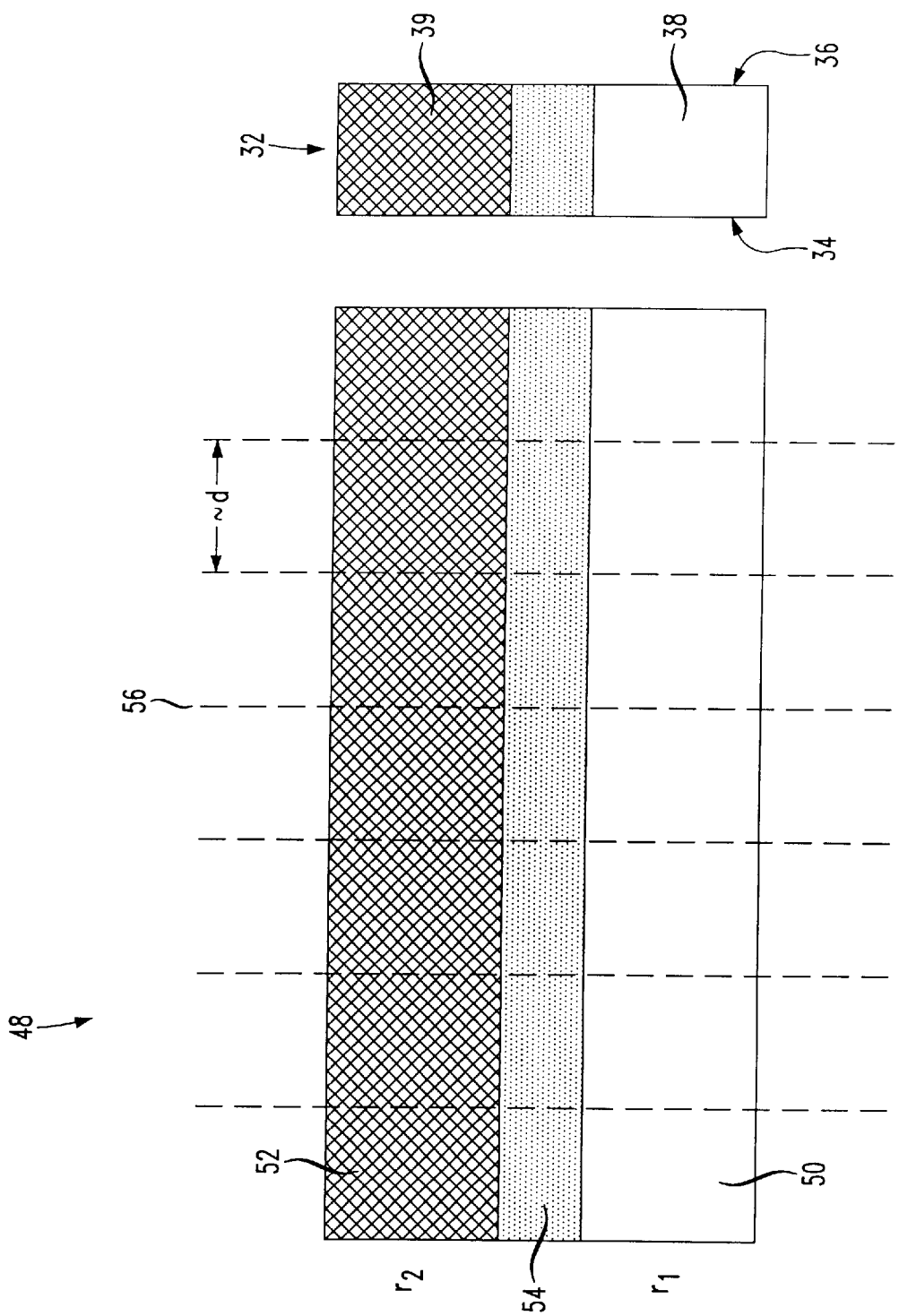
FIG. 6 is a diagram illustrating one method of producing the etalon of FIG. 4.

FIG. 6 is an illustration of one method of producing an etalon 30, such as illustrated in FIGS. 4 and 5, by making a initial ingot or brick 48 from which the etalon 30 will be cut. A first layer 50 is provided comprised of a material having a first index of refraction $r_1$. A second layer 52 comprising a material having a second index of refraction $r_2$ is formed over the first layer. The second layer may be separately grown, deposited, or otherwise placed on the first layer. An intermediate layer 54 having an index of refraction between $r_1$ and $r_2$ may also be separately introduced. Preferably, however, the intermediate layer is formed by diffusion of one or more components in the two layers 50, 52 across the initial boundary between the layers. The diffusion process introduces a gradual transition between the two layers and thus a gradual change from the first index of refraction $r_1$ to the second index of refraction $r_2$.

Once the brick 48 is formed, vertical slabs of the desired thickness are cut, e.g., along lines 56 as shown and ground, if necessary, to the desired thickness. Each slab serves as the body 32 of etalon 30. The cut surfaces 34, 36 are polished to an optical flatness using conventional techniques. Finally, the partially reflective coating is applied, as shown in FIGS. 3 and 5 to produce the final etalon 30.

The above described techniques and structures are well suited for etalons which discriminate between incident light at wavelengths that are not very closely spaced. However, in some applications, it is desirable to provide an etalon which can discriminate between wavelengths which are very closely spaced. For example, a newly developed laser communication system includes optical channels with wavelengths that vary by 0.4 nm around a center channel wavelength of 1550 nm. A conventional etalon formed of a material with an index of refraction $r_1=1.5$ must be 2 mm thick to provide a peak at every channel. For improved tunability, however, it is preferable to provide a single etalon which can also detect, in a separate region, wavelengths that are shifted upwards or downwards from the channel wavelengths by a fraction of a channel. To provide such a small shift, the index of refraction $r_2$ in the second etalon region should differ from the value of $r_1$, by approximately $2*10^{-4}$.

Figure 7:
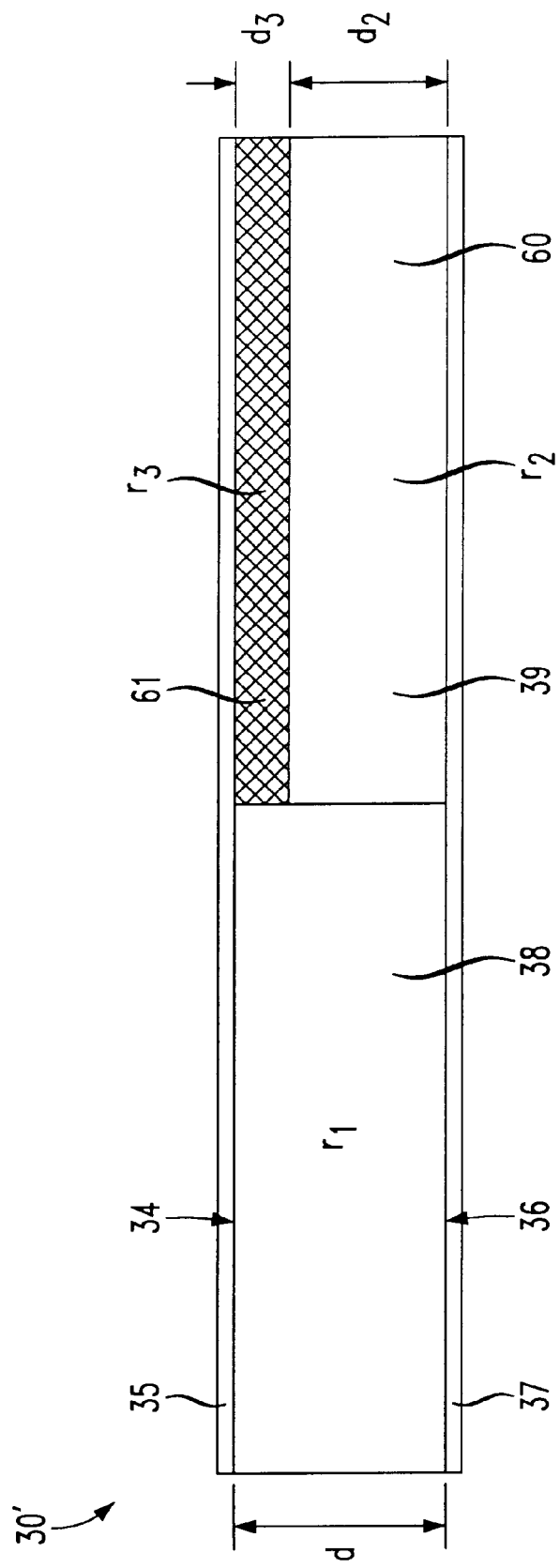
FIG. 7 is a diagram of a multi-wavelength etalon according to a third embodiment of the invention.

This small of a shift in the refraction index is difficult to uniformly achieve using conventional techniques, such as are used to dope glass in different layers of an optical fiber to have different indices of refraction. This fabrication issue is addressed in yet another embodiment of the invention, illustrated in FIG. 7. Similar to the etalon of FIG. 3, the etalon 30' of FIG. 7 contains two regions 38, 39 with differing indices of refraction. At least one of the regions, here region 39, contains a non-uniform index of refraction. In particular, region 39 is comprised of a first layer 60 having an index of refraction $r_2$ and thickness $d_2$ and a second layer 61 having a different refraction $r_3$ and thickness $d_3$, formed by, e.g., doping, growth, or other deposition techniques.

The average index of refraction $r_{AVG}$ through region 39 of the etalon is $(r_2*d_2/d)+(r_3*d_3/d)$. The indices of refraction $r_2$ and $r_3$ and thickness d2 and d3 are chosen such that the average index of refraction is equal to the desired value. Thus, small changes in the index of refraction can be achieved by keeping the second layer 61 very thin. It is apparent that if $r_2$ equals $r_1$, the difference in the index of refraction between the first and second regions 38, 39 is dependent upon the properties of the second layer 61. Because the thickness of the second layer can be very precisely controlled, it is possible to accurately introduce very small changes in the overall index of refraction between the first and second regions 38, 39 using conventional fabrication techniques.

To ensure that the separate layers in the etalon 30' do not introduce additional etalon effects, preferably, the etalon 30' is formed such that the boundary between the first and second layers 60, 61 is soft. A soft transition can be formed, e.g., by heating the etalon to permit the dopants in the second layer 61 to diffuse into the first layer and thereby eliminate the abrupt transition. In general, however, provided that the reflectivity of the etalon reflective surfaces 35, 37 is sufficiently great, e.g., 30% or more, the dominant effect within the etalon cavity will be the surface reflections and secondary effects caused by the multiple layers can be ignored.

While the invention has been particularly shown and described with reference to preferred embodiments thereof, it will be understood by those skilled in the art that various changes in form and details may be made therein without departing from the spirit and scope of the invention. For example, while the etalon of the invention has been discussed with only two primary regions, such an etalon may have multiple regions with differing indices of refraction.

I claim:

1. A multi-wavelength etalon comprising:
   a body which is transparent at least in a predetermined range of wavelengths and having top and bottom sides, each side being substantially optically flat and having a partially reflective coating thereon;
   the body having a first region extending cross-sectionally between the top and bottom sides and a second region extending cross-sectionally between the top and bottom sides and being horizontally displaced from the first region, and a third region extending cross-sectionally between the top and bottom sides, the third region situated between the first and second regions;
   the first region having a first index of refraction and the second region having a second index of refraction different from the first index of refraction, the third region having a third index of refraction of a magnitude between the first and second indices of refraction.

2. The etalon of claim 1, wherein the index of refraction of the third region varies between substantially said first index of refraction at a boundary between the first and third regions and said second index of refraction at a boundary between the second and third regions.

3. The etalon of claim 1, wherein the top and bottom sides are substantially parallel.

4. A multi-wavelength etalon comprising:
   a body which is transparent at least in a predetermined range of wavelengths and having top and bottom sides, each side being substantially optically flat and having a partially reflective coating thereon;
   the body having a first region extending between the top and bottom sides and a second region extending between the top and bottom sides and being horizontally displaced from the first region;
   the first region having a first index of refraction;
   the second region having first and second layers between the top and bottom sides, the first and second layers having different indices of refraction, an average index of refraction of the second region being different from the first index of refraction.

5. The etalon of claim 4, wherein the index of refraction of one of said first and second layers is substantially equal to the first index of refraction.

6. The etalon of claim 4, wherein the top and bottom sides are substantially parallel.

7. The etalon of claim 4, wherein the body further comprises a third region extending between the top and bottom sides, the third region situated between the first and second regions and having a third index of refraction of a magnitude between the first index of refraction and the average index of refraction.

* * * * *